United States Patent [19]

Böhm et al.

[11] Patent Number: 5,645,674

[45] Date of Patent: Jul. 8, 1997

[54] METHODS FOR ACHIEVING IMPROVED BOND STRENGTH BETWEEN UNVULCANIZED AND VULCANIZED RUBBERS

[75] Inventors: Georg G. A. Böhm, Akron; James F. Cetnar, Uniontown, both of Ohio

[73] Assignee: Bridgestone Corporation, Tokyo, Japan

[21] Appl. No.: 344,474

[22] Filed: Nov. 23, 1994

Related U.S. Application Data

[63] Continuation-in-part of Ser. No. 29,500, Mar. 11, 1993, abandoned.

[51] Int. Cl.$^6$ .................................. B32B 31/00; B32B 25/04
[52] U.S. Cl. .................... 156/273.5; 156/96; 156/123; 156/130.5; 156/306.9; 156/307.1; 428/493; 428/495; 428/519
[58] Field of Search .................................. 156/96, 110.1, 156/123, 130.5, 273.3, 273.5, 307.1, 307.3, 306.9, 275.5; 428/493–495, 515, 519

[56] References Cited

U.S. PATENT DOCUMENTS

| | | | |
|---|---|---|---|
| 1,068,691 | 7/1913 | Moomy | 428/493 |
| 1,274,091 | 7/1918 | Seward | 156/307.1 |
| 1,402,872 | 1/1922 | Langford | 156/307.1 |
| 1,434,892 | 11/1922 | Harrison et al. | 156/307.1 |
| 1,478,576 | 12/1923 | Morton et al. | 156/307.1 |
| 1,537,865 | 5/1925 | Morton | 156/307.1 |
| 1,537,866 | 5/1925 | Morton | 156/307.1 |
| 1,569,662 | 1/1926 | Miller | 156/307.1 |
| 1,640,800 | 8/1927 | Peterson | 423/473 |
| 1,777,960 | 10/1930 | Cadwell | 156/307.1 |
| 2,206,441 | 7/1940 | Winkelmann et al. | 156/307.1 |
| 2,570,829 | 10/1951 | Maxey et al. | 156/307.1 |
| 3,372,078 | 3/1968 | Fausti et al. | 428/519 |
| 3,485,712 | 12/1969 | Rehm | 161/240 |
| 4,089,360 | 5/1978 | Böhm | 152/330 |
| 4,116,883 | 9/1978 | Seiberling | 428/495 |
| 4,221,253 | 9/1980 | Seiberling | 152/330 |
| 4,851,063 | 7/1989 | Seiberling | 156/123 |
| 5,228,938 | 7/1993 | Kansupada et al. | 156/307.3 |
| 5,405,690 | 4/1995 | Hirakawa | 428/327 |

FOREIGN PATENT DOCUMENTS

| | | |
|---|---|---|
| 0 475 388A2 | 9/1990 | European Pat. Off. . |
| 39 26946A1 | 8/1989 | Germany . |
| 1392218 | 9/1972 | United Kingdom . |

*Primary Examiner*—Geoffrey L. Knable
*Attorney, Agent, or Firm*—Daniel N. Hall

[57] ABSTRACT

An improved method for achieving enhanced bond strength between components of unvulcanized and at least partially vulcanized rubber the improvement comprising the steps of selecting first and second initially unvulcanized rubber components (10, 12) for the manufacture of a vulcanized rubber article (21); applying an interphase layer (11) of rubber material, essentially devoid of crosslinking agents and containing from about 0.1 to about 4 parts by weight of at least one accelerator, per 100 parts by weight of rubber, to the first component; prevulcanizing the interphase layer and the first component together until both are at least partially vulcanized, establishing a gradient crosslink density (43) primarily in the interphase layer and thereby providing a lower crosslink concentration at the surface of the interphase layer opposite the first component; applying the second rubber component to the surface of lower crosslink density; and covulcanizing the components together, wherein the first and second unvulcanized rubber components and the interphase layer comprise rubber selected from the group consisting of natural and synthetic rubber and blends thereof. A similar improved method for achieving improved bond strength between components of unvulcanized and at least partially vulcanized rubbers the improvement comprising the steps of selecting two unvulcanized rubber components (10, 12) for the manufacture of a vulcanized rubber article (25, 35); treating one of the components under conditions that will establish a gradient crosslink density with a lower crosslink concentration at the surface (43); applying the other rubber component to the surface; and covulcanizing the components together.

4 Claims, 3 Drawing Sheets

METHODS FOR ACHIEVING IMPROVED BOND STRENGTH BETWEEN UNVULCANIZED AND VULCANIZED RUBBERS

CROSS-REFERENCE TO RELATED APPLICATIONS

This application is a Continuation-in-Part of U.S. Ser. No. 08/029,500, filed Mar. 11, 1993, now abandoned.

TECHNICAL FIELD

The present invention provides a method for improving or achieving good bond strength between layers or plies of vulcanized rubber or partially vulcanized rubber and of unvulcanized rubber. One application for the method is in the manufacture of rubber articles having multiple ply layers, at least two of which are contiguous, one being vulcanized i.e., precured, while the other is unvulcanized.

A number of manufacturing processes, including the fabrication of tires, require or would benefit from the assembly and subsequent covulcanization of precured and uncured rubber components. In the retreading of tires for example, in some instances precured treads are applied to a buffed, used carcass with the aid of a thin, uncured rubber layer. The radiation precuring of certain tire components has also become a well-accepted commercial processing technique which allows precured and uncured rubber components to be interfaced.

BACKGROUND ART

Tires, conveyor belts and reinforced high pressure hoses are typical of but a few of the articles wherein cured and uncured components can be contiguously combined. Generally, the manufacture of these articles involves the assembly of a plurality of layers of fully compounded rubber that have been reinforced with carbon black and the like. Tires, as a more particular example, include components such as beads, sidewalls, carcasses, treads, and belts. In some instances, it may be desirable to cure one or more of these individual components off site and prior to assembly and vulcanization of the tire. An advantage of precuring is to impart integrity to the rubber based component so that it will resist distortion during subsequent building and assembly operations which, in turn, allows more precise alignment of components, greater accuracy during building and, at the end of assembly, improved tires. Also, because the bead and tread stock components have varying thicknesses, by subjecting some such structural components to precure, the cure time of the final product can be decreased. Moreover, the ability to combine vulcanized and unvulcanized rubber based components would permit a variety of articles to be manufactured, such as tires, utilizing one or more "standard" components or elements to which variable elements e.g., treads, can be bonded.

Accordingly, it has been desirable to precure or vulcanize certain components either partially or fully prior to overall assembly to produce the finished article. Unfortunately, however, the bond interface between contiguous components, one of which is vulcanized and one of which is unvulcanized, has not been acceptable. One manner of improving the adhesion calls for the mechanical buffing of the surface of the vulcanized rubber component, but this is an extra step and cannot always be employed.

The major hurdle to a broader application of this technique of employing precured together with uncured components has been the lower adhesion observed between the precured and the uncured compounds following their covulcanization. The art has attempted to address the issue of developing or improving the bonding between contiguous rubber layers but has not always been successful where the layers are cured and uncured.

U.S. Pat. No. 1,274,091, for example, discloses a composite sheet of vulcanized rubber comprising sheets of uncured rubber that have been washed and dried, one of which is broken down by passage through rolls and contains a vulcanized agent, while the other is neither broken down nor contains a vulcanizing agent. The two uncured sheets are ultimately covulcanized.

U.S. Pat. No. 1,402,872 provides a method for uniting masses of vulcanizable rubber by interposing a layer of rubber without sulfur therebetween and then covulcanizing the multilayer mass.

U.S. Pat. No. 1,434,892 provides a method of forming a sheet of rubber by combining one ply containing sulfur with a second ply containing an accelerator and thereafter covulcanizing the multilayer sheet.

U.S. Pat. No. 1,478,576 is directed toward sheet rubber patch materials for the repair of inflatable rubber articles. The material comprises a composite including a rubber layer containing a non-migratory accelerator and a rubber layer containing sulfur.

Other U.S. patents which teach the covulcanization of uncured rubber sheets each containing different vulcanizing agents and/or amounts thereof include U.S. Pat. Nos. 1,537,865, 1,537,866, 1,569,662, 1,777,960, and 2,206,441.

Thus, while others have covulcanized rubber sheets comprising different vulcanizing agents and amounts, the art has not provided a method for attaining good adhesion between contiguous rubber articles or components, one of which is vulcanized and one of which is unvulcanized. More particularly, the art has not recognized heretofore, the existence of gradient crosslink densities at the interface between cured and uncured rubber and hence, has not been able to provide good adhesion therebetween.

The use of irradiation to effect a partial cure of at least a portion of a tire component, other than the tread, followed by conventional cure of the tire is disclosed in U.S. Pat. Nos. 4,166,883 and 4,221,253 and 4,851,063, respective divisionals. The foregoing patents do not suggest the use of an interphase layer according to the present invention.

DISCLOSURE OF THE INVENTION

It is therefore an object of the present invention to provide a method for bonding together and covulcanizing sheets of rubber or other rubber-based components, one of which is at least partially vulcanized and the other is unvulcanized, and to improve the bond strength therebetween.

It is another object of the present invention to provide a method for bonding together sheets of rubber or other rubber-based components and to improve the bond strength therebetween, involving the use of an interphase layer.

It is yet another object of the present invention to provide a method for bonding together sheets of rubber or other rubber-based components involving the use of an interphase layer that is devoid of crosslinking agents such as sulfur, sulfur donors, peroxides, sulfur-less curatives and the like.

It is yet another object of the present invention to provide a method for bonding together sheets of rubber or other rubber-based components, one of which is at least partially vulcanized and having a gradient crosslink density and the other is unvulcanized.

It is yet another object of the present invention to provide a method for bonding together sheets of rubber or other rubber-based components, one of which is at least partially vulcanized and the other is unvulcanized, which eliminates the procedure of mechanical buffing of the vulcanized rubber.

It is yet another object of the present invention to provide a method for bonding together sheets of rubber or other rubber-based parts involving the use of at least one chemical cure interfering agent.

It is yet another object of the present invention to provide a method for bonding together sheets of rubber or other rubber-based parts involving the use of irradiation to provide a gradient crosslink density.

At least one or more of the foregoing objects, together with the advantages thereof over known methods, which shall become apparent from the specification which follows, are accomplished by the invention as hereinafter described and claimed.

In general, the present invention provides an improved method for achieving enhanced bond strength between components of unvulcanized and at least partially vulcanized rubber the improvement comprising the steps of selecting first and second initially unvulcanized rubber components for the manufacture of a vulcanized rubber article; applying an interphase layer of rubber material, essentially devoid of crosslinking agents and containing from about 0.1 to about 4 parts by weight of at least one accelerator, per 100 parts by weight of rubber, to the first component; prevulcanizing the interphase layer and the first component together until both are at least partially vulcanized, establishing a gradient crosslink density primarily in the interphase layer and thereby providing a lower crosslink concentration at the surface of the interphase layer opposite the first component; applying the second rubber component to the surface of lower crosslink density; and covulcanizing the components together, wherein the first and second unvulcanized rubber components and the interphase layer comprise rubber selected from the group consisting of natural and synthetic rubber and blends thereof.

The present invention also provides an improved method for achieving improved bond strength between components of unvulcanized and at least partially vulcanized rubbers the improvement comprising the steps of selecting two initially unvulcanized rubber components for the manufacture of a vulcanized rubber article; treating one of the components under conditions that will establish a gradient crosslink density with a lower crosslink concentration at the surface to be adhered to the other component; applying the other rubber component to the surface; and covulcanizing the components together, wherein the first and second unvulcanized rubber components comprise rubber selected from the group consisting of natural and synthetic rubber and blends thereof.

PREFERRED EMBODIMENT FOR CARRYING OUT THE INVENTION

As noted hereinabove, practice of the present invention allows the bonding of rubbers, of the same or different chemical composition, and of dissimilar states of vulcanization, in a facile manner to achieve improved bond strengths. The method is useful in the manufacture of rubber goods from component plies or the like where it is desirable or necessary to join one component that is unvulcanized with another that is at least partially vulcanized.

Vulcanization involves crosslinking of the rubber molecules in the composition with the concentration of crosslink density governing the physical properties of the vulcanizate. By partially vulcanized is meant that the component is partially crosslinked and may be fully crosslinked to the level desired to achieve complete vulcanization. Partial vulcanization is useful where green strength is too low and, partial vulcanization will impart enhanced physical properties, to withstand subsequent manufacturing operations. Also, thicker rubber based components such as the bead area or the tread stock for tire manufacture may be partially vulcanized in order to reduce final cure time of the fully assembled product. Partial vulcanization is also useful where the final product can be assembled by selecting a particular rubber based component from a plurality of different such components which is, in turn, combined with a "standard" component. In the manufacture of tires, for instance, a standard carcass could be built and prevulcanized for the assembly of a variety of tires having different performance properties. By substitution of a treadstock, different tires could be produced having the same standard carcass.

In any instance, as the rubber is prevulcanized, a problem that develops during subsequent covulcanization of the components is that upon completion of the vulcanization a good bond has not developed at the interface because the at least partially vulcanized component may become excessively crosslinked at the interface, in effect, embrittling the rubber at the interface.

The methods of the present invention solve these problems and provide good bond strength at the interface of the rubber layers or components. They do so by imparting a gradient crosslink density in the prevulcanized component such that the state of cure is lower at the surface that is to become bonded to the adjacent layer of unvulcanized rubber component in the ultimate covulcanization of the two components.

In one aspect of the present invention, a thin layer of rubber material, referred to herein as the interphase layer, is applied between the layers or components of unvulcanized and at least partially vulcanized rubber. Initially, the interphase layer is applied to an unvulcanized rubber based component, both of which are subjected to prevulcanization. In another aspect of the present invention, the unvulcanized rubber based component is subjected to an irradiation cure under conditions which produce a gradient crosslink density. Such means include, for instance, high energy electrons and are useful because the degree of crosslink density can be varied through the thickness of the component.

In a third aspect of the present invention, the desired gradient crosslink density is developed by initially applying a cure interfering agent to a surface of one of the rubber based components, that is to become at least partially vulcanized. The agent can be applied to the unvulcanized rubber component which is then subjected to cure conditions sufficient to impart at least partial vulcanization. However, at the surface, little curing takes place while cure progresses within the thickness of the component. Alternatively, the agent can be applied to a surface of the rubber component subsequent to prevulcanization. In either instance, when the second, unvulcanized rubber based component is subsequently brought into contact with the formerly treated surface of the first component, a good bond is developed between the two components during covulcanization as a result of the gradient crosslink density being imparted due to the cure interfering agents.

Returning to the first aspect of the present invention, the composition of the interphase layer is preferably substantially identical to the composition of the first rubber based component, for compatibility. The composition of the interphase layer should also be compatible with the composition of the second rubber based component. By compatibility is meant that the rubber selected to form the interphase layer is one which will allow the interphase layer to adhere well to the first and second rubber components. Preferably, it will comprise a blend of the two rubbers used for the first and second rubber based components.

The interphase layer is preferably compounded without any crosslinking agents, e.g., sulfur; sulfur donors, peroxides, sulfur-less curatives and the like. For purposes of the present invention, the term crosslinking agent is employed in conjunction with compounds conventionally known to vulcanize rubbers, both natural and synthetic. Typical examples include sulfur; sulfur donors, such as thiuram disulfides and sulfur chloride: peroxides; sulfur-less curatives, such as selenium and tellurium; polysulfide polymers; p-quinone dioxime; dibenzoyl-p-quinone dioxime; the metallic oxides, such as zinc, lead and magnesium oxides; diisocyantes and the like. As is also known, such curatives can be employed alone to effect vulcanization or preferably with accelerators, which are not to be considered as crosslinking agents for practice of the present invention.

Accelerators are nevertheless, employed in the interphase layer in amounts ranging from about 0.1 to 4 parts per hundred of rubber (phr). Any of the conventional rubber accelerators can be employed such as the amines, thiurams, thiazoles, dithiocarbamates except for sulfur donors such as tetramethylethylenethiuram disulfide, sulfenamides and guanidines, it being understood that these accelerators are merely illustrative and that practice of the present invention is not necessarily limited to any specific accelerator, the presence thereof being merely optional. Moreover, while an accelerator may contain sulfur, no elemental sulfur or other crosslinking agents are employed in the interphase layer.

As will also be appreciated by those skilled in the art, accelerators are employed in conjunction with sulfur curatives, but not necessarily with non-sulfur curatives, such as for instance, the peroxides and other compounds disclosed hereinabove. Accordingly, in lieu of an accelerator, co-agents may be employed with the curative, one representative example being the use of unsaturated monomers with peroxide curatives which, upon activation, copolymerize with the rubber polymer and thereby crosslink it. Reference herein to the presence of at least one accelerator in the interphase layer is intended to refer to those interphase layer compounds that are sulfur curable while for compounds curable by another system, the term accelerator shall include co-agents, as discussed herein.

Rubbers that may be combined via the present invention include natural rubber and the synthetic rubbers. Synthetic rubbers are well known and include the ethylene/propylene copolymers, ethylene/propylene/diene terpolymers, halogenated rubbers, copolymers of a conjugated diene with at least one monoolefin, conjugated diene homopolymers and mixtures thereof with and without natural rubber. Natural/synthetic rubber blends can also be employed containing between about 5 to 95 parts by weight natural rubber with the remainder being synthetic rubber.

Examples of suitable halogenated polymers include chloroprene, (2-chloro-1,3-butadiene or neoprene), chlorosulfonated polyethylene, chloro- and bromobutyl rubber. Neoprenes are generally categorized as G-types, W-types and T-types, each being well known to those skilled in the art.

The copolymers may be derived from conjugated dienes such as 1,3-butadiene, 2-methyl-1,3-butadiene-(isoprene), 2,3-dimethyl-1,3-butadiene, 1,2-pentadiene, 1,3-hexadiene and the like, as well as mixtures of the foregoing dienes. The preferred conjugated diene is 1,3-butadiene. Regarding the monoolefinic monomers, these include vinyl aromatic monomers having from 8 to about 20 carbon atoms such as styrene, alpha-methyl styrene, vinyl naphthalene, vinyl pyridine and the like and optionally one or more halogen substituents; alkyl acrylates or methacrylates such as methyl acrylate, ethyl acrylate, butyl acrylate, methyl methacrylate, butyl methacrylate and the like; unsaturated nitriles such as acrylonitrile, methacrylonitrile and the like and vinyl halides such as vinyl chloride, vinylidene chloride, such as isobutene and the like and aliphatic monoolefins such as isobutene as well as mixtures of the foregoing monoolefins. The copolymers may contain up to 50 percent by weight of the monoolefin based upon the total weight of copolymer. A preferred copolymer is styrene-butadiene rubber (SBR) a copolymer of a conjugated diene, especially butadiene, and a vinyl aromatic hydrocarbon, especially styrene.

The above-described copolymers of conjugated dienes and their method of preparation are well known in the rubber and polymer arts. Many of the polymers and copolymers are commercially available. It is to be understood that practice of the present invention is not to be limited to any particular rubber included hereinabove or excluded. The rubber should be useful as a tire component although rubber compositions for other rubber articles may also be selected.

The compositions of the first and second rubber components will each contain a sufficient amount of one or more crosslinking agents, as described hereinabove, to effect vulcanization when subjected to curing at conventional temperatures and times. One or more accelerators can also be present in either or both first and second rubber components, again in a conventional amount for such compound and purposes. As will be explained next, the crosslinking agents and optional accelerators from the first and second rubber components also assist in the vulcanization of the interphase layer.

According to the present invention, it is now possible to combine and bond components comprising the same rubbers e.g. natural rubber to natural rubber or SBR to SBR or different rubbers, such as natural rubber to SBR, either of which can be unvulcanized at the time of final covulcanization. Where one rubber component is to be at least partially vulcanized prior to contact with the second rubber based component, according to one aspect of the present invention, a thin interphase layer is employed. Being substantially devoid of crosslinking agents, the interphase layer receives sulfur during prevulcanization by diffusion from the adjacent rubber component (formerly unvulcanized) and, in certain instances accelerators where the adjacent rubber component contained an accelerator. In this manner, a gradient crosslink density is established, primarily in the interphase layer, as will be discussed in conjunction with the drawing figures hereinbelow. Subsequently, when the at least partially vulcanized component is bonded to the other, unvulcanized rubber based component, a much greater bond strength is developed than where at least partially vulcanized and unvulcanized rubber based components have been covulcanized heretofore without an interphase layer.

As previously noted, the interphase layer, devoid of crosslinking agents, is preferably compounded from the same rubbers as the two rubber based components. The interphase layer may also comprise a block copolymer compatible with the two rubber based components or other compatible polymers. Generally, the composition and thickness of the interphase layer can be optimized for interposition between the two rubber based components. Nevertheless, a thickness of at least 0.010 inches is deemed to be practical, up to about 0.080 inches, although other thicknesses are not necessarily precluded. More particularly, a thickness of about 0.030 inches up to about 0.045 inches is preferred. Generally, a thinner interphase layer will be employed where the sulfur diffusion rate is low while a thicker interphase layer will be employed where the sulfur diffusion rate is high. Also, a thicker interphase layer will be employed where the amount of accelerator is low or the activity thereof is low while a thinner interphase layer will be employed where the amount of accelerator is high or the activity thereof is high.

A preferred method for practice of the present invention is to prevulcanize together one unvulcanized rubber based component and the interphase layer following which the second unvulcanized rubber based component and interphase layer of the prevulcanized product are brought into contact and subjected to covulcanization. Prevulcanization of the interphase layer and first rubber based component is conducted for a time and temperature sufficient to cause or allow development of physical properties to a fraction of the optimum reached during complete vulcanization. This fraction usually ranges from 10 to less than 100 percent of optimum, but is not limited to this range.

It is to be understood that cure conditions will vary depending upon the rubber compositions, their thicknesses and degree of vulcanizations, pre and post cure treatment, and thus, no useful purpose will be served by specifying a range of such conditions nor is such specification necessary. This is also true where the preferred method employs irradiation, as discussed hereinabove.

Where it is desired to employ an interfering agent, e.g., a cure retarder or cure deactivating agent, the interphase layer is not necessary. Instead, the cure interfering agent is applied to a surface of the rubber based component that is to become or has been at least partially vulcanized. Typical cure retarders are well known to those skilled in the art including, for instance, salicylic acid, phthalic anhydride, benzoic acid, N-(cyclohexylthio)phthalimide, N-nitrosodiphenylamine, and others as are known to those skilled in the art. Typical cure deactivating agents include mineral acids. One method of surface coating is to form a solution of the interfering agent in a solvent which can then be applied to the rubber based component in a suitable manner such as, but not limited to dipping, spraying, roller coating and the like. It is to be understood that practice of the present invention is not limited to any particular cure interfering agent disclosed herein or to the method of application. Similarly, the amount utilized is not a limitation although, for example, amounts from about 0.1 to about 10 phr will be effective.

Figure 1:
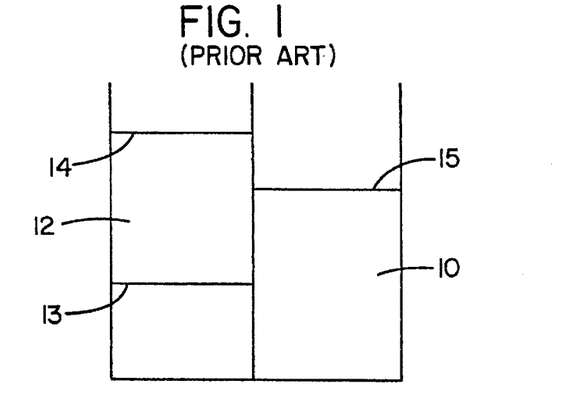
FIGS. 1 to 3 schematically depict the covulcanization of two rubber based components, one of which is prevulcanized, according to the prior art.
Figure 2:
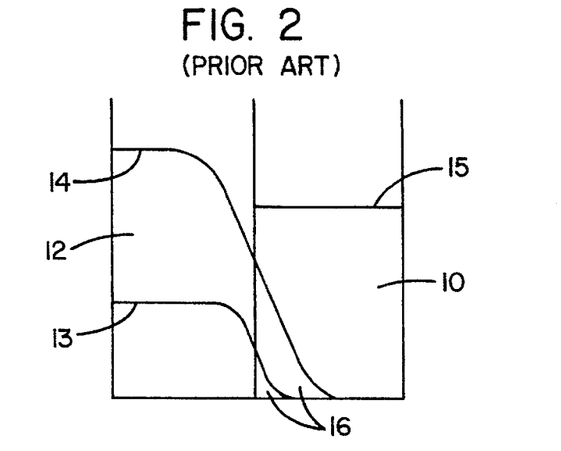
Figure 3:
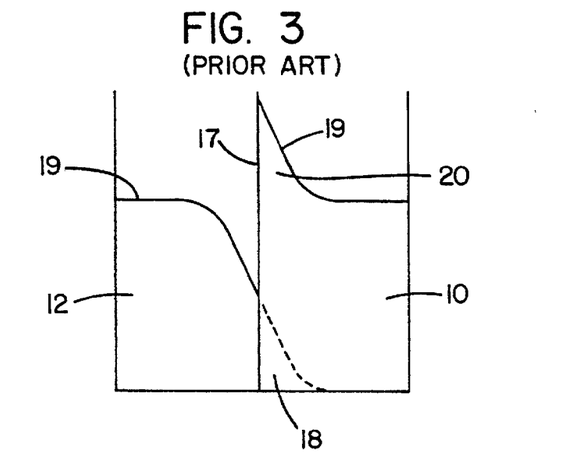

FIGS. 1 to 3 schematically show the concentration profiles of crosslinking agents and crosslinks formed in two rubber components, one of which is prevulcanized, and one of which is unvulcanized, and subsequently covulcanized together according to the prior art. In FIG. 1, component 10 is prevulcanized and component 12 is unvulcanized. Component 12 has a concentration of accelerator 13 and a concentration of sulfur 14. Component 10 has been prevulcanized with sulfur and an accelerator and provides a crosslink density 15. During covulcanization, depicted in FIG. 2, the sulfur and accelerator from component 12 diffuse into component 10, (area 16) contributing to the further crosslinking thereof. After covulcanizing, as depicted in FIG. 3, the crosslink density 19 of component 12 is lower near the interface 17 between the two components. In contrast, the presence of new crosslinks formed in component 10 during covulcanization (area 18), adding to the crosslink density 15 formed during prevulcanization, cause the crosslink density 19 to significantly increase near the interface of component 10. This region of excessive vulcanization and embrittlement 20 results in decreased adhesion and possibly premature failure of the article containing components 10 and 12.

Figure 4:
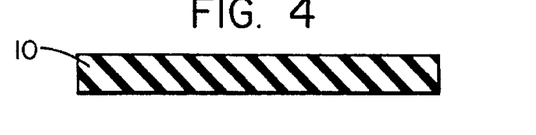
FIG. 4 is a cross-section of one layer of a rubber based component which is unvulcanized.
Figure 5:
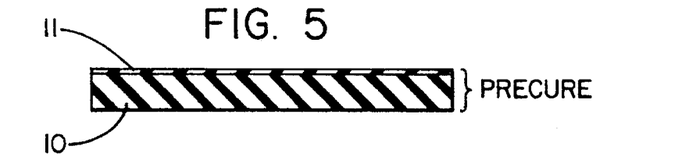
FIG. 5 is a cross-section of the component depicted in FIG. 4, and the application of an interphase layer thereon, according to the present invention, both being subjected to prevulcanization.
Figure 6:
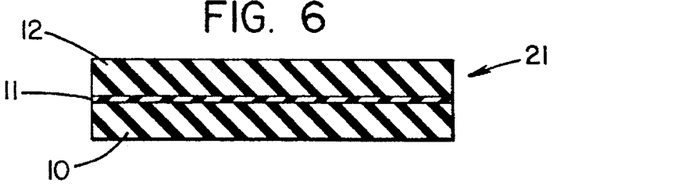
FIG. 6 is a cross-section of the layers depicted in FIG. 5, with the application of a second unvulcanized layer of rubber based component against the interphase layer and the final covulcanization thereof.
Figure 7:
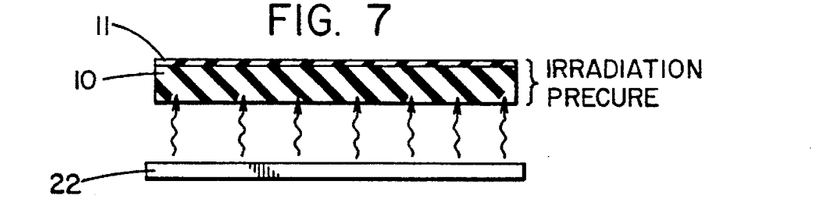
FIG. 7 is a cross-section of one layer of a rubber based component which is unvulcanized and the application of an interphase layer thereon, both being subjected to irradiation curing, according to another method of the present invention.
Figure 8:
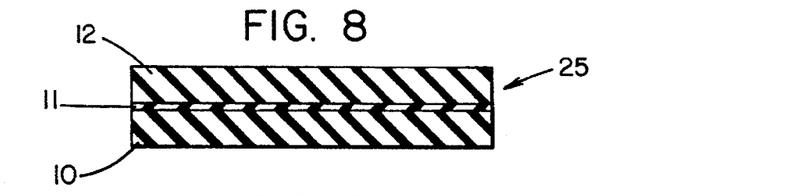
FIG. 8 is a cross-section of the layers depicted in FIG. 7, with the application of a second unvulcanized layer of rubber based component against the interphase layer and the final covulcanization thereof.

Practice of the three aspects of the present invention is depicted in FIGS. 4–10. In FIG. 4, a layer of unvulcanized rubber based component 10, depicted schematically, has been selected. In FIG. 5, the component 10 has applied against it an interphase layer 11. These two layers are first covulcanized following which the unvulcanized layer 12 is applied. In FIG. 6, the three layers have been covulcanized together to form a product 21. In FIG. 7, a layer of unvulcanized rubber based component 10 depicted schematically, also has applied against it an interphase layer 11, both of which are together first subjected to irradiation via suitable means 22, to develop a gradient crosslink density following which the second, unvulcanized rubber based component 12 is applied. The interphase layer 11 is optional and when employed, it may optionally contain one or more radiation inhibitors such as 2-naphthylamine; 6-phenyl-2,2,4-trimethyl-1,2-dihydroquinone and N,N'-dioctyl-p-phenylenediamine in an effective amount, known to those skilled in the art. Such amounts range, for instance, between about 0.1 to about 10 phr. Where no interphase layer is employed, the gradient crosslink density occurs by virtue of the irradiation. In FIG. 8, the two layers have been covulcanized together to form a product 25.

Figure 9:
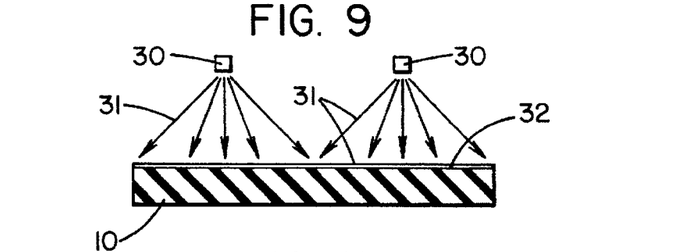
FIG. 9 is a cross-section of one layer of rubber based component and the application of a chemical cure interfering agent onto a surface thereof, according to a method of the present invention.
Figure 10:
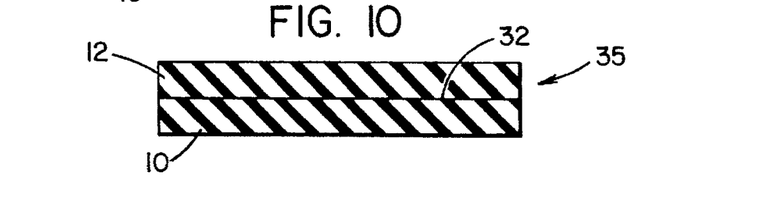
FIG. 10 is a cross-section of the layer depicted in FIG. 9, with the application of a second unvulcanized layer of rubber based component against the surface treated layer and the final covulcanization thereof.

Practice of the third aspect is depicted in FIGS. 9 and 10. A first layer of unvulcanized rubber based component 10 is treated by means 30 which applies a coating of cure interfering agent 31 onto a surface 32 of component 10. The component 10 is then prevulcanized sufficiently to develop at least a partial vulcanization. The second unvulcanized layer of rubber component 12 is then applied against the surface 32 and the two components are covulcanized together, as depicted in FIG. 9 to form the product 35.

Figure 11:
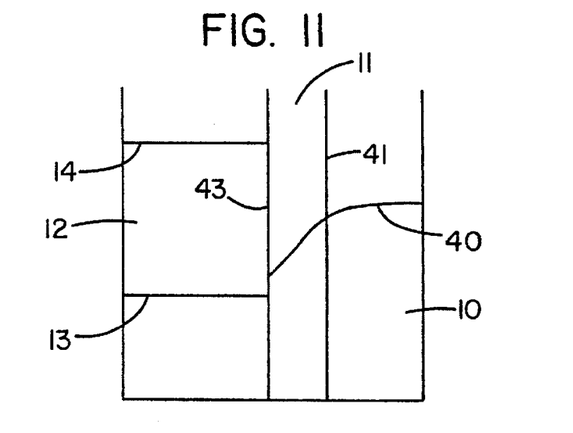
FIGS. 11 to 13 schematically depict the covulcanization of two rubber-based components and an interphase layer, as depicted in FIGS. 4 to 6.

FIGS. 11 to 13 show the concentration profiles of crosslinking agents and crosslinks formed in rubber components resulting from practice of the method of the present invention, described in conjunction with FIGS. 4 to 6. FIG. 11 again depicts the two rubber component layers 10 and 12 with an interphase layer 11 therebetween prior to covulcanization. The interphase layer 11 is devoid of crosslinking agents, present only in component layers 10 and 12; however, one or more accelerators are present in the interphase layer. Component layer 12 has a concentration of accelerator 13, and has been portion of sulfur 14. Component 10 has been prevulcanized with interphase layer 11 and it will be noted that the crosslink density thereof 40 decreases at the interface 41 between the two and continues to decrease across interphase layer 11. Thus, with the diffusion of sulfur and accelerator during prevulcanization, a gradient crosslink density is established across layer 11 providing a surface 43 of lower crosslink concentration.

Figure 12:
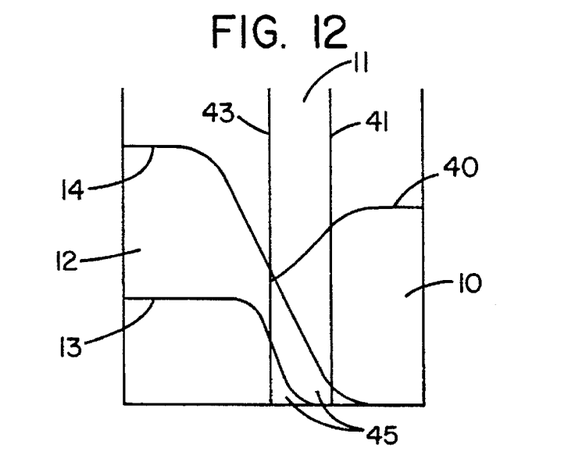
Figure 13:
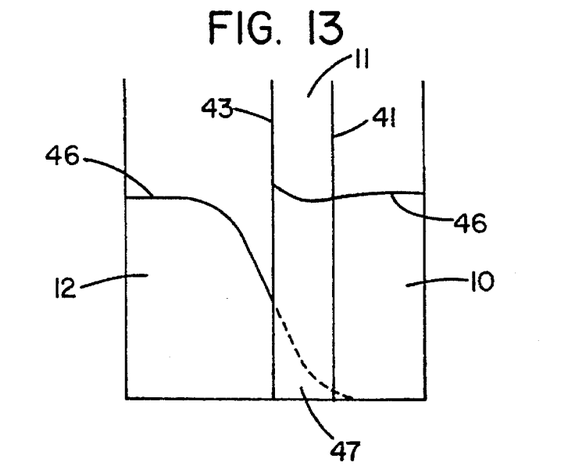

In FIG. 12, the two components 10 and 12 are being covulcanized and it will be noted that the sulfur and accelerator from component 12 diffuse into interphase layer 11, and into component 10 (area 45), contributing to the further crosslinking thereof. In FIG. 13, it is evident that the crosslinks formed during prevulcanization 40, together with the crosslinks generated as a result of the sulfur diffusion occurring during covulcanization (area 47) result in a more even crosslink distribution 46 throughout the composite and avoid the excessive vulcanization near the interface region of the prior art (FIG. 3).

In order to demonstrate the efficacy of the present invention, three rubber compounds were prepared which included a natural rubber compound (NR); a styrene butadiene rubber compound (SBR); and an interphase layer (IPL) comprising an SBR rubber and containing one accelerator. The compositions of these layers are presented in Tables I to III, with all numbers representing parts per hundred rubber, based upon 100 total parts by weight of rubber.

TABLE I

NATURAL RUBBER COMPOSITION

STOCK TYPE: NR

| | |
|---|---|
| Natural Rubber | 100.00 |
| Carbon Black | 62.00 |
| ZnO | 7.50 |
| Stearic Acid | 0.50 |
| Adhesion promoter | 0.88 |
| Paraphenylenediamine antioxidant | 2.00 |
| Antioxidant | 1.00 |
| Primary Sulfenamide accelerator | 0.50 |
| Secondary Sulfenamide accelerator | 0.30 |
| Sulfur blended in oil | 6.25 |
| Phthalimide retarder | 0.20 |
| TOTAL | 181.13 |

TABLE II

SBR COMPOSITION

STOCK TYPE: SBR

| | |
|---|---|
| SBR | 100.00 |
| Processing oil | 27.60 |
| Carbon Black | 54.00 |
| ZnO | 2.00 |
| Stearic Acid | 2.00 |
| Wax | 0.75 |
| Polymerized petroleum resin | 3.50 |
| Paraphenylenediamine antioxidant | 0.95 |
| Sulfur | 2.25 |
| Sulfenamide Accelerator | 0.60 |
| Sulfur donor | 0.60 |
| TOTAL | 194.25 |

TABLE III

INTERPHASE LAYER WITH ACCELERATOR

STOCK TYPE: SBR +
primary accelerator

| | |
|---|---|
| SBR | 100.00 |
| Processing oil | 27.60 |
| Carbon Black | 54.00 |
| ZnO | 2.00 |
| Stearic Acid | 2.00 |
| Wax | 0.75 |
| Polymerized petroleum resin | 3.50 |
| Diamine antioxidant | 0.95 |
| Sulfur | 0.00 |
| Sulfenamide Accelerator | 0.60 |
| TOTAL | 191.40 |

Peel adhesion studies were conducted utilizing the NR and SBR compounds with and without the IPL interphase layer. Several combinations of unvulcanized and vulcanized stocks were bonded together in the following procedure.

For testing purposes the rubber stocks to be adhered together were first milled to a thickness of 0.050 inch and cut into 6 inch squares. Rubber backing material reinforced with polyester cords was also prepared to the same dimensions. The first layer of backing was laid flat with the cords running horizontally. To this was applied a second layer of backing with the cords running vertically. One layer of test stock was then applied to the double backing layer thus completing one-half of the adhesion test pad. A second similar laminate was prepared for the second test stock intended for precuring, but it was also covered with a 6 inch square piece of interphase layer stock. The thickness of the interphase layer was between 0.010 inch and 0.080 inch and its composition was described hereinabove. The interphase layer was then covered with a 6 inch square piece of 0.006 inch polyester film. This film had either a smooth finish or a rough finish, as noted hereinbelow. (Where the test was for checking the adhesion between two unvulcanized test stocks, the interphase layer, polyester film, and prevulcanization step were omitted.) The second laminate was prevulcanized with the interphase layer in a positive pressure mold at approximately 278 psi for a time and temperature which resulted in a prevulcanization ranging between 50 and 100 percent of the optimum cure as determined by a shear rheometer. After prevulcanization, the laminate was demolded and the film was removed. Typical prevulcanization conditions for an SBR/interphase laminate were 11 minutes at 165° C.

A 2 inch by 6 inch polyester separator film was placed over one end of the test stock in the first laminate and arranged perpendicular to the cords in the second backing layer closest to the test stock. The prevulcanized laminate with the interphase layer was then laid face-to-face on top of the first laminate, with the cords in the backings closest to the test stocks running parallel. The assembled pads were then covulcanized in a positive pressure mold at approximately 278 psi at a temperature and time that was varied with the thickness of the interphase layer in direct proportion but always at least five minutes longer than the optimum cure time for the test stock in the first laminate, as determined by a rheometer cure curve. Typical covulcanization conditions for an SBR/interphase/NR laminate were 10 minutes at 165° C. After demolding, one inch by six inch test strips were die cut from the adhesion pad in such a way that the cords closest to the test stocks were parallel to the long axis of the test strip. The separator film was then removed and the test piece loaded into an Instron machine for 180° peel testing.

Peel adhesion values (lb/in) were determined for each of the bonded and covulcanized laminates as follows: The six inch by one inch strips were generally tested at a clamp speed of two inches per minute. The strength of the adhesive bond was measured in pounds per inch of sample width (typically one inch). At the start of the test the strength to initiate tearing at the adhesive interface reached a maximum and then was quickly followed by a succession of smaller maxima and minima for the balance of the test. The first maximum at the start of the test was taken as the Peak value, and the smaller maxima and minima were averaged mathematically to arrive at the Plateau value. Two or more strips from each pad were tested, and the individual Peak and Plateau values were averaged to arrive at the final Peak/Plateau results.

Measurements were taken at 23° C. and 100° C. and the results have been reported in Table IV for 12 separate examples as follows, comprising SBR as the unvulcanized or prevulcanized rubber component layers and, comprising SBR and natural rubber (NR) as the unvulcanized rubber component layers. The SBR, N R and interphase layers were prepared from compositions provided in Tables I to III. Thicknesses were varied with appropriate adjustments in cure times.

EXAMPLE NO. 1

Two SBR layers, of a composition shown in Table II, were separately laminated to two polyester cord-reinforced backing layers and then bonded together and covulcanized at 165° C. for 18 minutes.

EXAMPLE NO. 2

An SBR layer, laminated to two reinforced backing layers on one side and a smooth, 0.006-inch thick polyester film on the other side, was precured at 165° C. for 11 minutes. The polyester film was then removed and the freshly exposed rubber surface was bonded to and then covulcanized with a laminate comprising an unvulcanized SBR layer and two reinforced backing layers at a temperature of 165° C. for 16 minutes.

EXAMPLE NO. 3

An SBR layer, laminated to two reinforced backing layers on one side and a rough, 0.006-inch thick polyester film on the other side, was precured at 165° C. for 13 minutes. The polyester film was then removed and the freshly exposed rubber surface was bonded to and then covulcanized with a laminate comprising an unvulcanized SBR layer and two reinforced backing layers at a temperature at 165° C. for 16 minutes.

EXAMPLE NO. 4

An SBR layer, laminated to two reinforced backing layers on one side and a smooth polyester film on the other side, was precured at 165° C. for 13 minutes. The polyester film was then removed and the freshly exposed surface was first buffed and cleaned, and subsequently bonded to and covulcanized with a laminate comprising an unvulcanized SBR layer and two reinforced backing layers at a temperature of 165° C. for 16 minutes.

EXAMPLE NO. 5A

An SBR layer, laminated to two reinforced backing layers on one side and an interphase layer of 0.045-inch thickness on the other side, was prevulcanized at 165° C. for 13 minutes. The composition of the interphase layer was that listed in Table III. The polyester sheet, which covered one side of the interphase layer, was then removed and the freshly exposed surface was bonded to and then covulcanized with a laminate comprising an unvulcanized SBR layer and two reinforced backing layers at a temperature of 165° C. for 16 minutes.

EXAMPLE NO. 5B

An SBR layer, laminated to two reinforced backing layers on one side and an interphase layer of 0.045-inch thickness on the other side, was prevulcanized at 165° C. for 13 minutes. The composition of the interphase layer was that listed in Table III but without any accelerator. The polyester sheet, which covered one side of the interphase layer, was then removed and the freshly exposed surface was bonded to and then covulcanized with a laminate comprising an unvulcanized SBR layer and two reinforced backing layers at a temperature of 165° C. for 16 minutes.

EXAMPLE NO. 6

An SBR layer of a composition shown in Table II, and a NR layer of a composition shown in Table I, were separately laminated to two polyester cord-reinforced backing layers. The two laminates were then bonded together and covulcanized at a temperature of 165° C. for 11 minutes.

EXAMPLE 7

An SBR layer, laminated to two reinforced backing layers on one side and a smooth, 0.006-inch thick polyester film on the other side, was precured at 165° C. to 11 minutes. The polyester film was then removed and a freshly exposed rubber surface was bonded to and then covulcanized with a laminate comprising an unvulcanized NR layer, of a composition shown in Table I, and two reinforced backing layers at a temperature of 165° C. for 10 minutes.

EXAMPLE 8

An SBR layer, laminated to two reinforced backing layers on one side and a rough, 0.006-inch thick polyester film on the other side, was precured at 165° C. for 13 minutes. The polyester film was then removed and the freshly exposed rubber surface was bonded to and then covulcanized with a laminate comprising an unvulcanized NR layer, of a composition shown in Table I, and two reinforced backing layers at a temperature of 165° C. for 10 minutes.

EXAMPLE 9

An SBR layer, laminated to two reinforced backing layers on one side and a smooth polyester film on the other side, was precured at 165° C. for 11 minutes. The polyester film was then removed and the freshly exposed surface was first buffed and cleaned, and subsequently bonded to and covulcanized with a laminate comprising an unvulcanized NR layer, of a composition shown in Table I, and two reinforced backing layers at a temperature of 165° C. for 10 minutes.

EXAMPLE 10A

An SBR layer, laminated to two reinforced backing layers on one side and an interphase layer of 0.045-inch thickness on the other side, was prevulcanized at 165° C. for 13 minutes. The composition of the interphase layer was that listed in Table III. The polyester sheet, which covered one side of the interphase layer, was then removed and the freshly exposed surface was bonded to and then covulcanized with a laminate comprising an unvulcanized NR layer, of a composition shown in Table I, and two reinforced backing layers at a temperature of 165° C. for 11 minutes.

EXAMPLE 10B

An SBR layer, laminated to two reinforced backing layers on one side and an interphase layer of 0.045-inch thickness on the other side, was prevulcanized at 165° C. for 13 minutes. The composition of the interphase layer was that listed in Table III but without any accelerator. The polyester sheet, which covered one side of the interphase layer, was then removed and the freshly exposed surface was bonded to and then covulcanized with a laminate comprising an unvulcanized NR layer, of a composition shown in Table I, and two reinforced backing layers at a temperature of 165° C. for 11 minutes.

employed interphase layers but which did not contain any accelerators and it is readily apparent that the bond formed between Components 1 and 2 was not as good, thereby establishing the efficacy of the present invention in the use of interphase layers without crosslinking agents but with accelerators. The plateau values for Examples No. 1 and 9 were reported as greater than (>) the stated numerical value because tearing to the backing occurred rather than tearing at the bond interface. Hence, the bond strength at the interface between the stocks was undetermined, but it is thought to be greater than the strength of the bond between the stock and the reinforced backing.

Based upon the foregoing disclosure, it should now be apparent that the use of the methods described herein will carry out the objects set forth hereinabove. It should also be apparent to those skilled in the art that the methods of the present invention can be practiced to achieve improved adhesion between a variety of rubber layers and components utilized in the manufacture of tires and other articles built from a plurality of plies or different components. Similarly, the time, temperatures and pressures for vulcanization can readily be determined by those skilled in the art.

It is, therefore, to be understood that any variations evident fall within the scope of the claimed invention and thus, the selection of specific rubber compositions for the unvulcanized rubber based layers or components as well as the composition and thickness of the interphase layer can be determined without departing from the spirit of the invention herein disclosed and described. Moreover, the scope of the invention shall include all modifications and variations that fall within the scope of the attached claims.

What is claimed is:

1. An improved method for achieving enhanced bond strength between components of unvulcanized and at least partially vulcanized rubber the improvement comprising the steps of:

TABLE IV

PEEL ADHESION VALUES - PEAK/PLATEAU

| | COMPONENTS IN LAMINATE | | PEEL ADHESION (LBS/INCH) | | | |
|---|---|---|---|---|---|---|
| | | | 23° C. | | 100° C. | |
| EXAMPLE | COMPONENT 1 | COMPONENT 2 | PEAK | PLATEAU | PEAK | PLATEAU |
| 1 | SBR (Unvulcanized) | SBR (Unvulcanized) | 226 | >91 C. | 111 | >58 C. |
| 2 | SBR (Unvulcanized) | SBR (Prevulcanized with smooth polyester film) | 198 | 134B | 48 | 44B |
| 3 | SBR (Unvulcanized) | SBR (prevulcanized with rough polyester film) | — | — | 53 | 46B |
| 4 | SBR (Unvulcanized) | SBR (prevulcanized and then buffed) | 189 | 146B | — | — |
| 5A | SBR (Unvulcanized) | SBR (prevulcanized with interphase layer)[a] | 264 | 226B | 102 | 96B |
| 5B | SBR (Unvulcanized) | SBR (prevulcanized with interphase layer)[b] | 208 | 190B | — | — |
| 6 | NR (Unvulcanized) | SBR (unvulcanized) | 212 | 71A | 10 | 10A |
| 7 | NR (Unvulcanized) | SBR (prevulcanized with smooth polyester film) | 110 | 22A | 9 | 6A |
| 8 | NR (Unvulcanized) | SBR (prevulcanized with rough polyester film) | 150 | 35A | 7 | 7A |
| 9 | NR (Unvulcanized) | SBR (prevulcanized and then buffed) | 168 | >90 C. | — | — |
| 10A | NR (Unvulcanized) | SBR (prevulcanized with interphase layer)[a] | 267 | 162B | 153 | 98B |
| 10B | NR (Unvulcanized) | SBR (prevulcanized with interphase layer)[b] | 100 | 66A | — | — | a - accelerator present in interphase layer, no crosslinking agents
b - no accelerator present in interphase layer, no crosslinking agents
A - Smooth Interfacial Tear
B - Cohesive Tear at Interface
C - Tear through test stock to reinforced backing As is evident from Table IV, Example Nos. 5A and 10A, according to a method of the present invention resulted in much improved adhesion values over Example Nos. 2 and 7 without any interphase layers as well as the techniques involving the use of smooth, rough and buffed surfaces. For purposes of comparison, Example Nos. 5B and 10B, selecting first and second initially unvulcanized rubber components for the manufacture of a vulcanized rubber article, both said components containing crosslinking agents;

applying an interphase layer of rubber material, devoid of crosslinking agents capable of vulcanizing said interphase layer alone, in any amount capable of vulcanizing said interphase layer and containing from about 0.1 to about 4 parts by weight of at least one accelerator, per 100 parts by weight of rubber, to said first unvulcanized component;

prevulcanizing said interphase layer and said first component together whereby said first component becomes vulcanized and a gradient crosslink density is established in the interphase layer thereby providing a lower crosslink concentration at the surface of said interphase layer opposite said first component;

applying said second unvulcanized rubber component to said surface of lower crosslink density; and covulcanizing said components together, wherein said first and second unvulcanized rubber components and said interphase layer comprise rubber selected from the group consisting of natural and synthetic rubber and blends thereof, said interphase layer requiring the migration of a portion of said crosslinking agents from both said first and second rubber components to become fully vulcanized.

2. A method, as set forth in claim 1, wherein said first unvulcanized rubber component is natural rubber and said second unvulcanized rubber component is selected from the group consisting of synthetic rubbers and blends thereof.

3. A method, as set forth in claim 1, wherein said first unvulcanized rubber component is selected from the group consisting of synthetic rubbers and blends thereof and said second unvulcanized rubber component is natural rubber.

4. A method, as set forth in claim 1, wherein said interphase layer has a thickness of from about 0.010 inches up to about 0.080 inches.

* * * * *